US008894895B2

(12) United States Patent
Fredholm et al.

(10) Patent No.: US 8,894,895 B2
(45) Date of Patent: Nov. 25, 2014

(54) POROUS CERAMIC PROCESSING USING A CO-PRILLED WAX AND NON-IONIC SURFACTANT MIXTURE

(75) Inventors: Michele Fredholm, Vulaines sur Seine (FR); David Henry, Morigny-Champigny (FR); Maxime Moreno, St Ange le Vieil (FR)

(73) Assignee: Corning Incorporated, Corning, NY (US)

( * ) Notice: Subject to any disclaimer, the term of this patent is extended or adjusted under 35 U.S.C. 154(b) by 462 days.

(21) Appl. No.: 13/110,406

(22) Filed: May 18, 2011

(65) Prior Publication Data

US 2011/0294650 A1 Dec. 1, 2011

(30) Foreign Application Priority Data

May 27, 2010 (EP) .................................... 10305557

(51) Int. Cl.
*C11B 15/00* (2006.01)
*C04B 38/00* (2006.01)

(52) U.S. Cl.
CPC ..................................... *C11B 15/00* (2013.01)
USPC .............................. 264/43; 264/630; 264/631

(58) Field of Classification Search
CPC .... C11B 15/00; C04B 38/0006; C04B 38/067
USPC .............................. 264/42, 43, 610, 630, 631
See application file for complete search history.

(56) References Cited

U.S. PATENT DOCUMENTS

| | | | |
|---|---|---|---|
| 3,885,977 | A | 5/1975 | Lachman et al. |
| 4,299,631 | A | 11/1981 | Kennedy et al. |
| 4,483,944 | A | 11/1984 | Day et al. |
| 4,601,997 | A | 7/1986 | Speronello |
| 4,855,265 | A | 8/1989 | Day et al. |
| 4,950,628 | A | 8/1990 | Landon et al. |
| 5,183,608 | A | 2/1993 | Guile |
| 5,258,150 | A | 11/1993 | Merkel et al. |
| 5,290,739 | A | 3/1994 | Hickman |
| 6,210,626 | B1 | 4/2001 | Cornelius et al. |
| 6,238,619 | B1 | 5/2001 | Bischoff et al. |
| 6,254,822 | B1 | 7/2001 | Brundage |
| 6,319,870 | B1 | 11/2001 | Beall et al. |
| 6,368,992 | B1 | 4/2002 | Beall et al. |
| 6,432,856 | B1 | 8/2002 | Beall et al. |
| 6,555,031 | B2 | 4/2003 | Gadkaree et al. |
| 6,620,751 | B1 | 9/2003 | Ogunwumi |
| 6,699,429 | B2 | 3/2004 | Lu et al. |
| 6,773,657 | B2 | 8/2004 | Beall et al. |

(Continued)

FOREIGN PATENT DOCUMENTS

| | | | |
|---|---|---|---|
| EP | 25780 | A1 * | 3/1981 |
| WO | 2004011386 | A1 | 2/2004 |
| WO | 2005046840 | A1 | 5/2005 |
| WO | 2006015240 | A2 | 2/2006 |

*Primary Examiner* — Erin Snelting
(74) *Attorney, Agent, or Firm* — Matthew B. McNutt

(57) ABSTRACT

This disclosure is directed to porous ceramic processing; and in particular to a method using selected pore forming materials to avoid high exotherms during the ceramic firing process, and the green bodies formed using the selected pore forming materials. The selected pore forming materials are homogeneous wax/non-ionic surfactant particles formed by a prilling process in which the wax is melted and the non-ionic surfactant is mixed into the wax prior to prilling. The disclosure is useful in the manufacture porous ceramic honeycomb bodies including ceramic honeycomb filter traps.

5 Claims, 6 Drawing Sheets

(56) References Cited

U.S. PATENT DOCUMENTS

| | | | |
|---|---|---|---|
| 6,849,181 | B2 | 2/2005 | Ogunwumi et al. |
| 6,864,198 | B2 | 3/2005 | Merkel |
| 6,942,173 | B1 | 9/2005 | Abramov |
| RE38,888 | E | 11/2005 | Beall et al. |
| 7,001,861 | B2 | 2/2006 | Beall et al. |
| 7,259,120 | B2 | 8/2007 | Ellison et al. |
| 7,294,164 | B2 | 11/2007 | Merkel |
| 2004/0020846 | A1 | 2/2004 | Ogunwumi et al. |
| 2004/0029707 | A1 | 2/2004 | Beall et al. |
| 2004/0092381 | A1 | 5/2004 | Beall et al. |
| 2004/0261384 | A1 | 12/2004 | Merkel et al. |
| 2005/0046063 | A1 | 3/2005 | Toda et al. |
| 2005/0069469 | A1 * | 3/2005 | Fu et al. ........................ 422/177 |
| 2008/0293564 | A1 | 11/2008 | Saha et al. |
| 2009/0011179 | A1 | 1/2009 | Kikuchi et al. |
| 2009/0033005 | A1 * | 2/2009 | Bookbinder et al. ......... 264/628 |
| 2009/0057939 | A1 * | 3/2009 | Henry et al. .................... 264/43 |

* cited by examiner

POROUS CERAMIC PROCESSING USING A CO-PRILLED WAX AND NON-IONIC SURFACTANT MIXTURE

CROSS-REFERENCE TO RELATED APPLICATIONS

This application claims the benefit of priority under 35 U.S.C. §119 of European Patent Application Serial No. 10305557.0 filed on May 27, 2010 the content of which is relied upon and incorporated herein by reference in its entirety.

FIELD

This disclosure is related to porous ceramic processing; and in particular to a method using selected pore forming materials to avoid high exotherms during the ceramic firing process, and the green bodies formed using the selected pore forming materials.

BACKGROUND

At the present time many porous ceramics used in pollution control devices (for example, particulate filters or filter traps, and flow-through catalyst supports) are manufactured using pore formers to increase the ceramic porosity; for example, carbon particles, graphite, and starches among others are used as pore forming agents. However, the use of materials such as carbon particles, graphite and starches as pore former can lead to high exotherms during the firing cycle and to slow and/or very complex firing schedules, such as in batch kilns. It is the object of the present disclosure to present a novel method using selected materials for making porous ceramic particulate filter traps that have suitable porosity and lower exotherms during the firing process.

SUMMARY

The present disclosure is directed to the use of sprayable and more particularly prilling-compatible compositions containing at least one wax compound and at least one surfactant and the associated process to enable efficient wax particles incorporation into ceramic batches during mulling processes. It has been discovered that non-ionic surfactants having Hydrophilic Lipophile Balance (HLB) value greater than 6, can be easily mixed with the raw waxy materials (for example without limitation, cyclododecane (CDD), polyethylene wax and other waxy materials) before prilling the waxy materials into wax/surfactant particles for use in the ceramic materials batching process. In some embodiments the HLB value is greater than 10. The shaping process can be dropping, atomization or spraying with or without air assistance (that is, airless spraying or atomization, a method which uses hydraulic pressure to spray or atomize a fluid, for example, paint or molten wax). Spraying or atomization of the molten material to form solid particles, which are known prilling techniques, are particularly well suited for forming surfactant containing wax pore formers. Prilling of a mixture containing a wax and at least one non-ionic surfactant having in some embodiments a HLB value>6 (and in other embodiments preferentially HLB>10) makes possible the easy dispersion of the prilled material in batched ceramic forming materials, pre-ceramic slurries or pre-ceramic plasticized batches without detrimental effect on the batching process. The prilled wax/surfactant pore formers made accordingly to the process of the present disclosure do not agglomerate when mixed with water and are easily incorporated into the batched ceramic-forming materials. Finally, after the sintering or firing step, the ceramic is preferably free of leaking cells due to pore formers, such as holes from agglomerated pore-formers, which can lead to more efficient filtration capacity.

In one aspect the disclosure is directed to a water dispersible solid wax material consisting essentially of a prilled homogeneous mixture of a selected wax having a melting point of less then or equal to 170° C. and a non-ionic surfactant having an HLB>6. In some embodiments the non-ionic surfactant has an HLB>10. In one embodiment the selected wax material has a melting point in the range of 45-170° C. In some embodiments the selected wax has a melting point in the range of 80-130° C. The wax can be selected from the group consisting of natural paraffin wax(es), beeswax, polyethylene glycol waxes, polypropylene glycol waxes and waxes made from a combination polyethylene glycol and polypropylene glycol, polymerized α-olefins waxes including combinations of α-olefins, chemically modified waxes and substituted amide waxes, and combinations thereof. The non-ionic surfactant can be selected from the group consisting of ethoxylated nonylphenols, ethoxylated octylphenols, PEO-PPO [polyethylene oxide-polypropylene oxide block copolymers], Tween 80 (polyoxyethylene sorbitan monooleate), dodecylphenol ethoxylate, dinonylphenol ethoxylate, linear and branched alcohol ethoxylates, and tallow amine ethoxylate, and combinations thereof.

In another aspect the disclosure is directed to a method of making a water dispersible solid wax material, said method comprising melting a selected wax in a heated vessel, mixing a selected non-ionic surfactant into the molten wax, and prilling the wax/surfactant mixture to form a water dispersible solid wax/surfactant material.

In a further aspect the disclosure is directed to an extruded pre-ceramic green body, said green body comprising ceramic-forming inorganic materials, an organic binder(s) and a wax/non-ionic surfactant pore forming agent and water; and, optionally, lubricants. The ceramic-forming inorganic materials are advantageously selected from the group consisting of cordierite ceramic-forming materials, aluminum titanate ceramic-forming materials, SiC ceramic-forming compositions and mullite ceramic-forming materials, and combinations thereof.

In an additional aspect the disclosure is directed to a method for preparing a ceramic green body (for example without limitation a honeycomb green body) comprising the steps of providing a batch composition; providing a binder material, a liquid (typically an aqueous based liquid), and a pore former material; mixing the batch composition with the binder, liquid and pore former to form a plasticized extrudable paste; extruding the paste to form a pre-ceramic green body, for example without limitation, a honeycomb pre-ceramic green body; and drying the green body to form a pre-ceramic green body to reduce its moisture content before firing; wherein the provided pore former material comprises a wax/non-ionic surfactant particular pore former. In some embodiments prilled pore formers can be added to the batch composition as an aqueous dispersion. The method can be used with batch compositions selected from the group consisting of a cordierite batch composition, a SiC composition, a mullite batch composition and an aluminum titanate batch composition. The pre-ceramic green body can then be fired (cerammed) at selected firing conditions to form a ceramic body, for example, a honeycomb ceramic.

The present disclosure provides a novel way of using selected materials for making porous ceramic bodies that do not have wall holes, and which can be used, for example, to make filter traps or particulate filters. The method and materials described herein may be used to produce filters with suitable porosity, no holes in the ceramic walls and which experience lower exotherms during the firing process during their manufacture.

DETAILED DESCRIPTION

Figure 1:
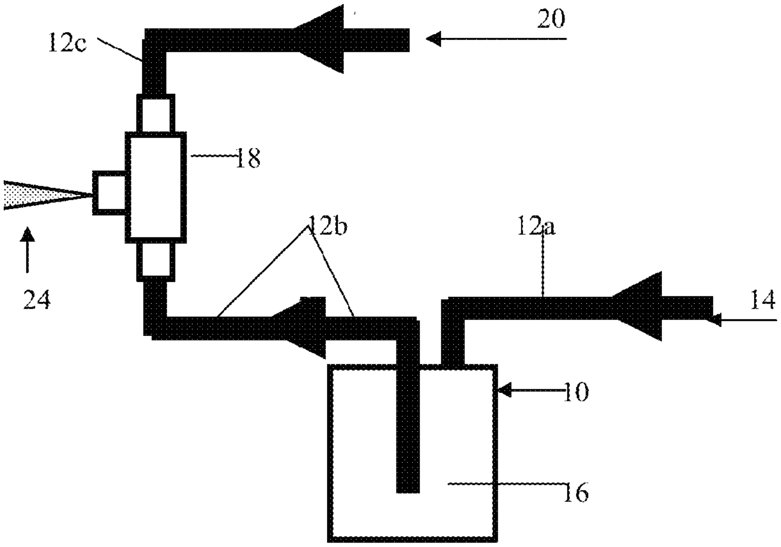
FIG. 1 is a schematic drawing illustrating the prilling/spraying process.

Herein the term "prilling" means to convert a molten solid to a granular, free-flowing form (the granules readily pour without sticking to one another or the vessel containing them) that is generally spherical in shape. Prilling can be accomplished by dropping the molten material from the top of a tall tower (a "prilling tower," "dropping tower," or "shot tower"), or by spraying or atomizing the molten material through the orifice of a suitable device. Prilling (drop, shot) towers are used in the fertilizer and detergent industries, and are also used to make lead shot for ammunition. Prilling by spraying or atomization are used to form smaller prills that are useful in cosmetics, food and animal feed. Prilling is thus includes spraying or atomization and the terms may be used interchangeable herein. The wax/surfactants materials used in the examples herein were made by spraying or atomization. The terms "co-prilling" and "co-prilled" means prilling a mixture of a selected wax and a selected non-ionic surfactant into a granular, free-flowing form, the resulting prilled material containing both wax and non-ionic surfactant material which is also called herein a "wax/non-ionic surfactant material" or "wax/non-ionic surfactant particles". Herein the term "wax' means a meltable, low molecular polymeric material that can be natural or synthetic. The waxes herein have a melting point of less than or equal to 170° C. In some embodiments the waxes selected for co-prilling with a non-ionic surfactant have a melting point in the range of 45-170° C. In other embodiments the waxes have a melting point in the range of 80-130° C. Herein the term "consisting essentially of" limits the scope of a claim to the specified materials or steps and those that do not materially affect the basic and novel characteristic(s) of the claimed invention.

Chemically, the selected waxes may contain a wide variety of long-chain alkanes, esters, polyesters and hydroxy esters of long-chain primary alcohols and fatty acids. Examples of natural waxes are carnauba wax and beeswax (a mixture of ceroic acid and its homologs, myricin and some free melissic acid, nyricyl alcohol and uncombined ceryl alcohol), and herein paraffin waxes (typically obtained from petroleum sources). Synthetic waxes are made from a variety of materials, the most common being ethylene glycol and propylene glycol and mixtures of the two. Examples of synthetic waxes include PE-PP (polyethylene-polypropylene) waxes, PEG-PPG (polyethylene glycol-polypropylene glycol) waxes, polymerized $\alpha$-olefin waxes (e.g. polyethylene, polypropylene, poly 1-butene, etc.), chemically modified waxes (for example, saponified or esterified waxes), and substituted amide waxes (for example without limitation, N,N-ethylene bis-stearamide, methylene bis-phenylstearmide, and amide waxes as disclosed in U.S. Pat. No. 4,049,680). In some embodiments the synthetic waxes are cyclododecane (CDD), paraffin, PE-PP (polyethylene-polypropylene), and mixed PEG-PPG waxes When "waxes," natural or synthetic, are used as-is for pore forming agents they tend to agglomerate when mixed with in an aqueous medium that is typically added to the pre-ceramic batch materials. As a result, when a wax pore forming material is added using an aqueous medium and formed into a green body, for example, by extrusion, in some areas of the extruded green body there can be a high concentration of the wax pore former such that after the green body has been fired, holes or cracks can develop in the wall of the ceramic body, and these holes or cracks can result in leakage. For example, in a filter trap the incoming fluid (for example, particulate-containing such vehicular exhaust or a particulate-containing process stream such a particle-containing air or water stream) enters one end of the filter trap, passes through the walls of the trap and exits through the other end of the filter trap. The particulate matter is collected during its tortuous path through the network of pores in the trap walls was as the particulate-containing fluid passes through the pores. If the filter trap has holes or cracks completely through the walls from one side of the wall to the other, then particulates can pass completely through the wall without being collected. As a result filtration efficiency is greatly lowered. The disclosure shows that when a selected wax is melted, mixed with a selected nonionic surfactant and prilled to form particles, typically spheres, the resulting wax/surfactant pore former ("w/s") will disperse in water and not agglomerate. As a result, when the wax/surfactant is added to a ceramic batch mixture along with the binder and an aqueous medium, the wax/surfactant can be homogenized it into the batch, and localized high concentrations of wax/surfactant that will lead to the cracks or holes in the walls of the fired ceramic are avoided The present disclosure is directed to sprayable and prilling-compatible compositions containing at least one wax compound and at least one specific surfactant, and the associated process to enable the incorporation of surfactant-containing wax particles into ceramic batches during the mulling process. The wax/surfactant materials according to the disclosure are free-flowing and can be dispersed in aqueous media. In accordance with the present disclosure, non-ionic surfactants having Hydrophilic Lipophile Balance (HLB) value higher than 6 can be easily mixed with raw waxy materials (for example, CDD and polyethylene wax) before shaping the wax into particles. The shaping process can be spraying or pulverization with or without air assistance. Spraying of the molten material, also known as the prilling technique, is particularly well suited for the formation of surfactant-containing wax particles. In some embodiments a mixture containing a wax and at least one non-ionic surfactant having a HLB value>6 is prilled to form particles. In some embodiments the non-ionic surfactant has a HLB value>10.

Co-prilling a mixture of a wax and a non-ionic surfactant makes it possible to easily disperse the surfactant-containing prilled wax material by direct addition, or as an aqueous dispersion, into the batched ceramic-forming materials, pre-ceramic slurries or pre-ceramic plasticized batches without detrimental effect to the batching or ceramic green body forming processes. The dispersion of the wax/surfactant materials can be cream-like or it can be less viscous depending on the surfactant/water ratio. Prilled waxes that do not contain a non-ionic surfactant cannot be dispersed in water when mixed, and immediately collect on the surface of the water when mixing is stopped. In contrast, prilled wax particles that contain a non-ionic surfactant do not agglomerate when mixed with water. Consequently, co-prilled wax/surfactant materials can easily be processed into the other ceramic-forming batch materials. In addition, during the firing process, green bodies formed using wax/surfactant pore formers do not exhibit the high exotherm that is observed when other pore formers such as graphite, carbon and starch are used. Finally, after sintering or firing step, the ceramic has been found "leaker" free: that is, there are no leaking cells due to holes in the cell walls resulting from pore-former agglomeration, which means that a ceramic body such as a particulate filter has a more efficient filtration capacity than one having leaking cells.

Disclosed herein are novel pore forming materials that can be easily processed during the forming of ceramic bodies, for example ceramic honeycombs that are used in emission control devices, for example, particulate trap honeycombs (also called filter traps), in which particulate-containing fluids enter a honeycomb channel that is blocked at one end. The fluid passes through the honeycomb walls and exits an adjacent channel through an unblocked end while the particulates in the fluid are retained on the walls of the channel in which fluid entered. The novel pore forming materials are selected waxes that have been mixed with selected non-ionic surfactants and prilled to form solid wax/surfactant particulates. The process of mixing a selected wax with a selected non-ionic surfactant and prilling the mixture produces a homogeneous material that can be used to make a homogeneous ceramable batch mixture that is then formed into a "green body" and fired to form a ceramic body such as a particulate filter having a honeycomb body. In the case of porous ceramic for filtration applications, the use of the non-ionic surfactant results in a honeycomb product that has a greatly reduced number of defects such as leaking walls (cracks or holes in the walls) which result in a loss of filtration efficiency.

Examples of the selected waxes are, without limitation, cyclododecane (CCD) and polyethylene waxes (for example, CPW 461, CPW 461H or CPW 561, Hase Petroleum Wax Co. Arlington Heights, Ill.; or the Darent Wax Company, Ltd, South Darenth, UK). The polyethylene waxes used herein are low molecular weight waxes (MW in the range of 850-1500) and have a melting point in the range of 45-170° C.

Examples, without limitation, of the selected non-ionic surfactants that can be added to and co-prilled with the waxes are:

1. Ethoxylated nonylphenols: For example without limitation, Dow Tergitol™ NP-57, NP-6, NP-7, NP-8, NP-9, NP-10, NP-11, NP-12 and NP-13 (Dow Chemical Co., Midland, Mich.); Huntsman Surfonic® N-60, N-85, N-95, N-100, N-102, N-120, N-150 (Huntsman Performance Products, The Woodlands, Tex.); and Igepal CO-520, CO-530, CO-610, CO-630, CO-660, CO-710, CO-720 (Rhodia UK Ltd, Watford, Hertfordshire).
2. Ethoxylated octylphenols: for example without limitation, Triton™ X-45, X-114, X-120, X-100, X-102 (Dow Chemical Co., Midland, Mich.) and Rhodia Igepal® CA-520, CA-620, CA-630, CA-720 (Rhodia UK Ltd, Watford, Hertfordshire).
3. PEO-PPO [polyethylene oxide-polypropylene oxide block copolymers]; for example without limitation, Poloxamer Pluronic L-series materials such as L-35 (BASF, Florham Park, N.J.).
4. Tween 80
5. Other surfactants: For example without limitation, dodecylphenol ethoxylate, dinonylphenol ethoxylate, linear and branched alcohol ethoxylate (for example, dodecylalcohol ethoxylate, tridodecylalcohol ethoxylate), and tallow amine ethoxylate (for example, Surfonic® T-10, T-15 and T-20 (Huntsman Performance Products, The Woodlands, Tex.).

As a comparative example, sodium dodecyl sulphate (SDS), which is an anionic surfactant, was evaluated and was found to be immiscible with CDD; that is, the surfactant could not be mixed with the molted wax. As a result the CDD could not be dispersed in aqueous media. HLB values for suitable surfactants and a comparative example is given in the Table 1. In some embodiments the HLB values are greater than 6. In other embodiments the HLB values are greater than 10.

TABLE 1

| Surfactant | HLB Value | Comment |
|---|---|---|
| Pluronic L-35 | 18.0-23.0 | Disperses‡ |
| Tween 80 | 15.0 | Disperses‡ |
| Igepal CA-720 | 14 | Disperses‡ |
| Tergitol NP-10 | 13.2 | Disperses‡ |
| Igepal CA-520 | 10.3 | Disperses‡ |
| Igepal CO-520 | 10.0 | Disperses‡ |
| Span 20 | 8.6 | Disperses‡ |
| Span 40* | 6.7 | Disperses‡ |
| Igepal CA-210 | 5.1 | Non-dispersible† |
| Igepal CO-210 | 4.6 | Non-dispersible† |
| Span 65* | 2.1 | Non-dispersible† |
| SDS*: anionic surfactant | No | Could not mix with molten wax |

*solid surfactant; the other surfactants were fluids of having varying degrees of viscosity ‡"Disperses" means that the wax and surfactant mix in the molten state and the prilled mixture disperses in water.

†"Non-dispersible" means the prilled wax/surfactant mixture would not disperse in water.

In general, the process of co-prilling a wax mixed with a surfactant consists of mixing the molten wax with a non-ionic surfactant followed by spraying the wax/surfactant mixture to obtain particles that are generally spherical in shape. By tuning spraying process and operating conditions, spherical particles size from a few microns (approximately 3) to a few millimeters (approximately 2) in diameter can be obtained. In some embodiments the co-prilled wax/surfactant articles are in the size range of 3 μm to 2 mm. In some embodiments particles are in the size range of 5 μm to 250 μm. In some embodiments the particles are in the size range of 5 μm to 100 μm. By using a mixture of spherical particles sizes, the ceramic's pore size can be tailored as needed to fit with the application. Ceramics having a mean pore size of from few a microns to tens of microns can be obtained, the selected pore size being dependent on the intended use (that is, dependency on particulates intended to be removed using a filter trap). In some embodiments the ceramic mean pore size is in the range of 5 μm to 100 μm. In some embodiments the ceramic mean pore size is in the range of 5-50 μm. The spraying can be done with or without air assistance. The process can be summarized as:

1. Heating the wax in a vessel to a temperature above its melting temperature.
2. Adding the non-ionic surfactant and mixing it with the molten wax.
3. Transporting the molten wax/surfactant mixture from the vessel to a heated spray nozzle having an orifice.
4. Heating the piping to a temperature above the wax melting point to prevent the wax/surfactant mixture from clogging the piping.
5. Spraying the wax/surfactant mixture into a chamber which is at a temperature at which the sprayed wax/surfactant will solidity, for example, at room temperature or below room temperature.

The spraying can be air-assisted as illustrated in FIG. 1 or it can be carried out using airless spraying technology. With an airless spray system, a hydraulic pump siphons a fluid material out of a reservoir, and then pumps the material, usually under pressures that depend on the type of material being sprayed, to a spray nozzle. For example, for fluids such as paint or other viscous liquids, the pressures (at room temperatures, approximately 18-30° C.), can be in the range of 1,000 to 3,000 psi. For more fluid materials, for example, water, the pressures can be in the range of 10-20 psi. Molten wax/surfactant materials will fall within these foregoing extremes depending on the temperature of the specific wax/surfactant mixture. The fluid material atomizes as it passes through the orifice in the tip of the spray nozzle. The size and shape of the orifice determine the degree of atomization, and hence the size of the prilled particles, the shape and width of the fan pattern formed by the sprayed wax/surfactant liquid. Airless spray systems are available worldwide from a variety of manufacturers, for example, Titan Tool Inc, Plymouth, Minn. USA and Nordson Corporation, Amherst, Ohio USA.

FIG. 1 is a schematic of a pressurized spraying/prilling process using a heated vessel 10 containing a liquid mixture 16 of molten wax and non-ionic surfactant, air line 12*a* for pressurizing the vessel 10 with a gaseous fluid 14 (for example, air or nitrogen) so that the liquid wax/surfactant mixture 16 is forced to flow through liquid transport line 12*b* to nozzle 18 where is it pressurized by pressuring gas 20 (for example air or nitrogen) from line 12*c* and forced through the orifice (not illustrated or numbered) of nozzle 18 to form a spray 24 consisting of droplets of the wax/surfactant mixture. Spray 24 droplets are collected in a cooling chamber (not illustrated) at room temperature or below where the droplets solidify. The piping 12*a*, 12*b* and 12*c*, and the nozzle 18 are heated to prevent clogging by the liquid mixture 16 and, optionally, to pre-warm the pressuring gas 20.

Figure 2:
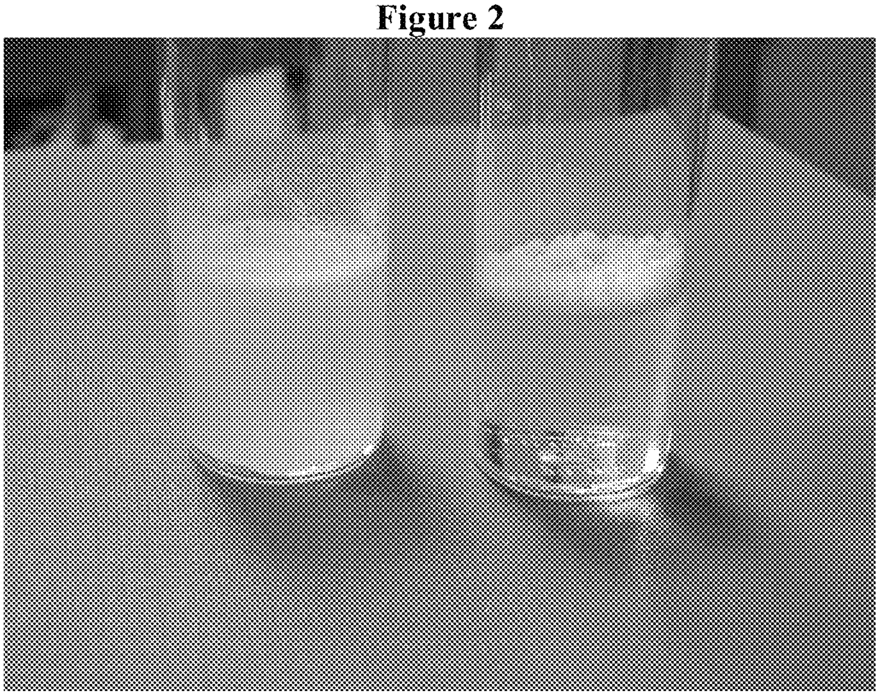
FIG. 2 is a photograph illustrating 5 wt % dispersions in water of polyethylene wax co-prilled with 5 wt % NP-10 Tergitol non-ionic surfactant (left) versus prilled polyethylene wax prilled without the surfactant.

When prilled wax/surfactant pore forming materials are mixed with water to form an aqueous suspension, the materials remain in suspension instead of agglomerating on the surface of the water. The fact that the wax/surfactant pore formers remain suspended insures that when the suspension is added to and mixed with a batch of ceramic-forming materials, the pore forming materials will be homogeneously distributed throughout the ceramic-forming batch materials. The absence of agglomerates in the batch substantially lessens the probability that when the batched materials are extruded into a honeycomb green body there will be a localized concentration of pore forming materials that, when burned out during firing, will result in a defect such as a crack or hole in the wall of the cerammed honeycomb. FIG. 2 compares a pore former of polyethylene wax co-prilled with 5 wt % NP-10 Tergitol non-ionic surfactant (left vessel) versus a pore former of polyethylene wax prilled without surfactant (right vessel). In both cases the vessels contain 5 wt % of the respective pore former, the remaining 95 wt % being water. The pore formers were manually mixed with the water. As FIG. 2 illustrates, due to its hydrophobicity, polyethylene wax cannot mix with water, and stay at or rises to the surface of the water despite manual mixing. In contrast, in the vessel on the left containing the prilled wax/surfactant, the wax/surfactant particles were suspended in the water and substantially remain suspended in the water. The small amount of material that has collected at the top of the left vessel is due to standing during the time it was necessary to take the picture. In actual practice the suspension of the wax/surfactant material is added under dynamic conditions so that the material remains suspended. Increasing the amount of non-ionic surfactant in the wax will also lessen the probability that material will collect at the top of the vessel upon standing.

Figure 3:
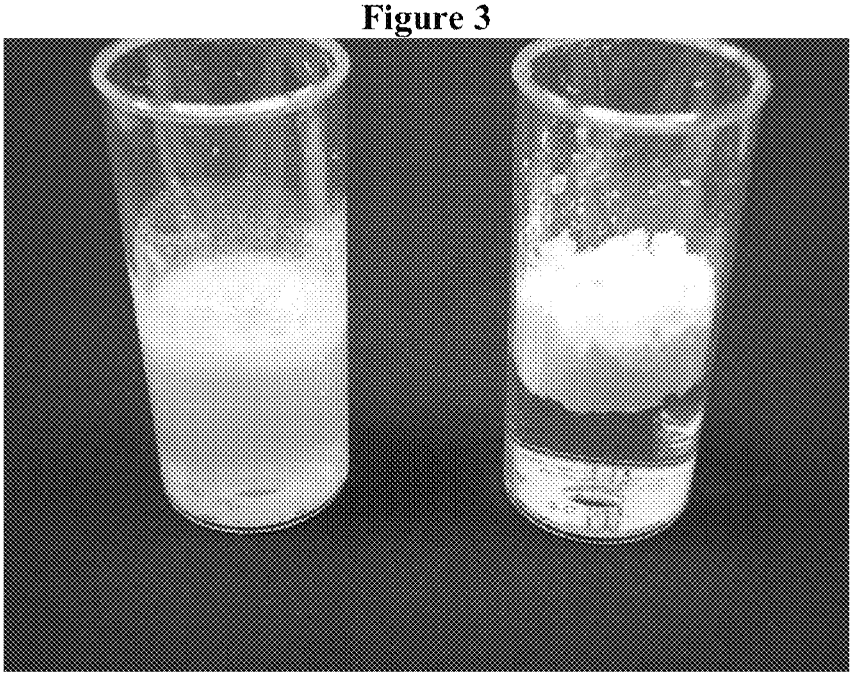
FIG. 3 is a photograph illustrating 5 wt % dispersions in water of CDD wax co-prilled with 5 wt % NP-10 Tergitol non-ionic surfactant (left) versus CDD wax prilled without the surfactant (right).

FIG. 3 compares CDD wax co-prilled with 5 wt % NP-10 Tergitol non-ionic surfactant (left vessel) versus CCD was prilled without surfactant (right vessel). In both cases the vessels contain 5 wt % of the respective pore former, the remaining 95 wt % being water. The pore formers were manually mixed with the water. As FIG. 3 illustrates that due to its hydrophobicity, CDD wax cannot mix with water and stay at the surface of the water despite manual mixing. In contrast, in the vessel on the left containing the co-prilled wax/surfactant, the wax/surfactant particles were suspended in the water. The small amount of material that has collected at the top of the left vessel is due to standing during the time it was necessary to take the picture. In actual practice the suspension of the wax/surfactant material is added under dynamic conditions so that the material remains suspended. Increasing the amount of non-ionic surfactant in the wax will also lessen the probability that material will collect at the top of the vessel upon standing.

Figure 4:
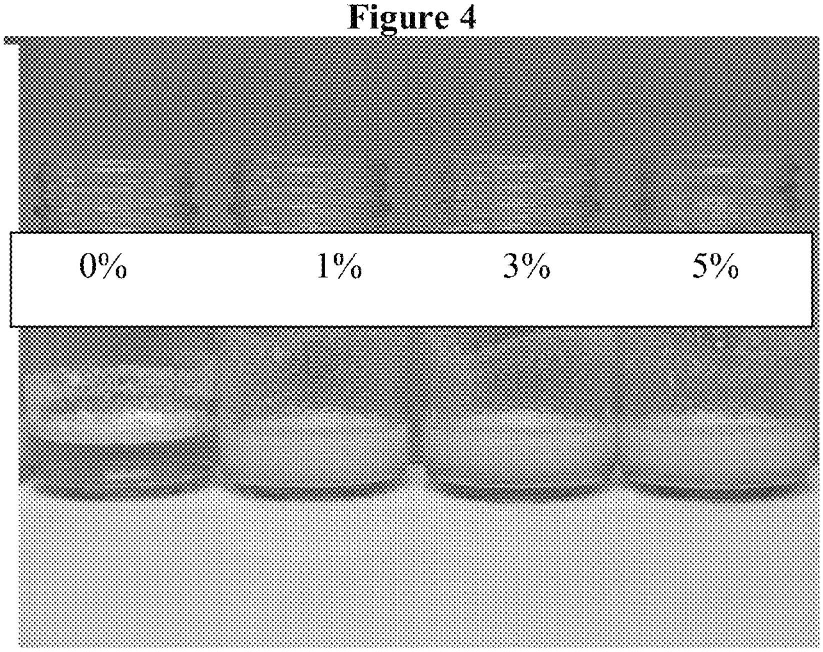
FIG. 4 is a photograph illustrating 10 wt % dispersion in water of CDD wax co-prilled with, from left to right, 0, 1, 3 and 5 wt % NP-10 Tergitol non-ionic surfactant.

FIG. 4 illustrates prilled CDD containing by weight, from left to right, 0%, 1%, 3% and 5% NP-10 Tergitol. In each case 10 wt % of the respective CCD material was mixed with 90 wt % water and manually stirred. As FIG. 4 illustrates, even at 1% NP-10 in CDD is hydrophilic and remains in suspension.

Figure 5:
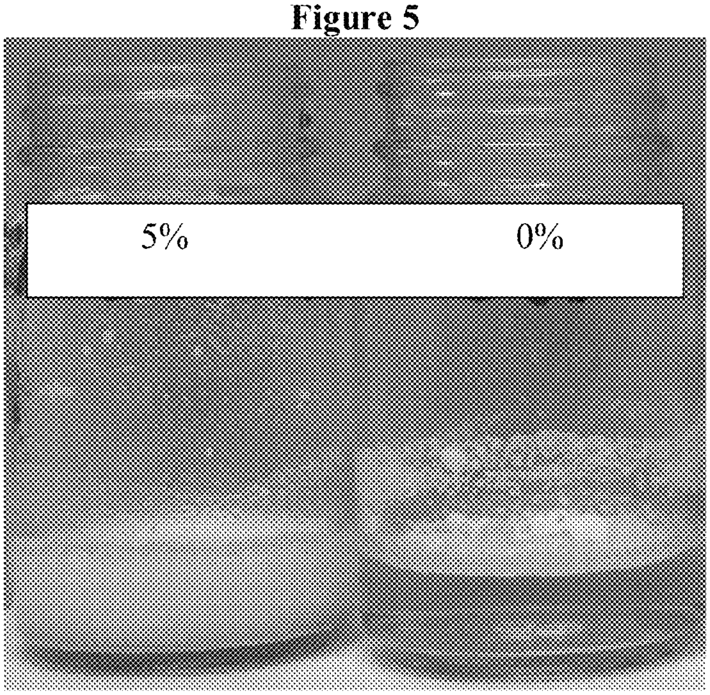
FIG. 5 is a photograph illustrating 5 wt % dispersions in water of CDD wax co-prilled with 5 wt % Pluronic® L35 block copolymer non-ionic surfactant (left) versus CDD wax prilled without the surfactant (right).

FIG. 5 compares CDD wax co-prilled with 5 wt % PEO-PPO non-ionic surfactant (left vessel) versus CCD was prilled without surfactant (right vessel). In both cases the vessels contain 5 wt % of the respective pore former, the remaining 95 wt % being water. As FIG. 5 illustrates, due to its hydrophobicity, CDD wax cannot mix with water and stay at the surface of it, despite manual mixing. In contrast, in the vessel on the left containing the co-prilled wax/surfactant, the wax/surfactant particles were suspended in the water.

Figure 6:
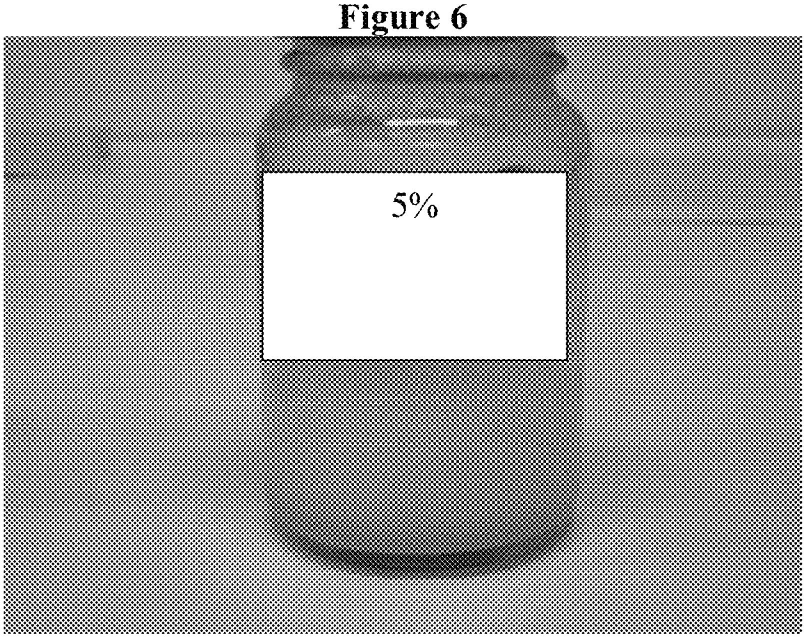
FIG. 6 is a photograph illustrating a dispersion in water of CDD wax co-prilled with 5 wt % Tween non-ionic surfactant.

FIG. 6 illustrates the suspension of CDD was that was co-prilled with 5 wt % Tween 80. The suspension was formed using 5 wt % CDD/surfactant and 95 wt % water. The co-prilled CDD/surfactant is well suspended in the water.

Figure 7:
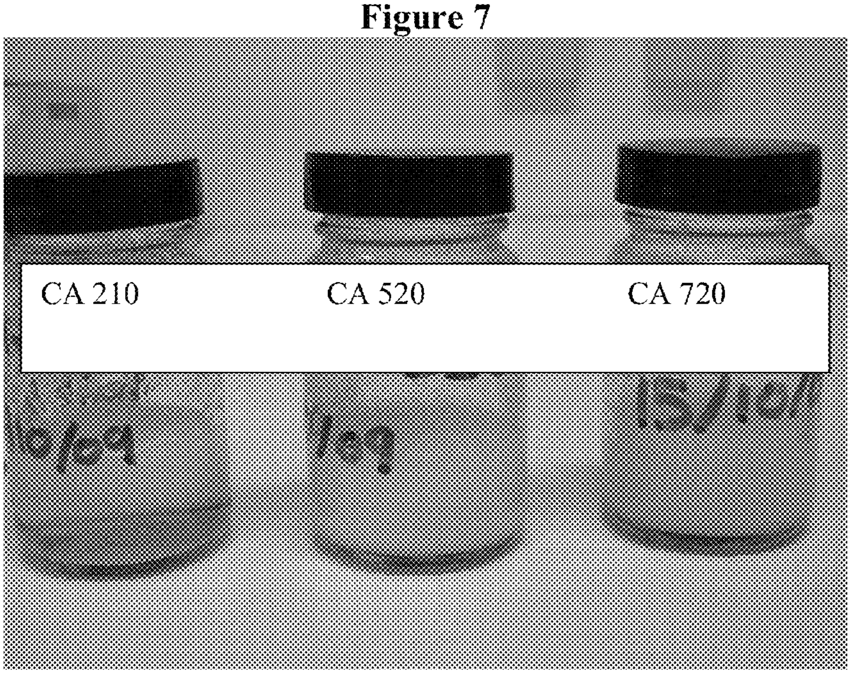
FIG. 7 is a photograph illustrating 5 wt % dispersions in water of CDD wax co-prilled with, from left to right, 5 wt % Igepals CA 210, 5 wt % CA 520 and 5 wt % CA 720 non-ionic surfactants, respectively.

FIG. 7 illustrates the suspension of CDD was that was co-prilled with, from left to right, 5 wt % of Igepal CA 210 [(4-($C_8H_{17}$)—$C_6H_4$—$OCH_2CH_2OCH_2CH_2OH$, MW=294)], Igepal CA 520 [(4-($C_8H_{17}$)—$C_6H_4$—O($CH_2CH_2O$)$_4$$CH_2CH_2OH$, MW=426) and Igepal CA 720[4-($C_8H_{17}$)—$C_6H_4$—O($CH_2CH_2O$)$_{11}$$CH_2CH_2OH$, MW=734], respectively. As previous mentioned the Igepal CA non-ionic surfactants are ethoxylated octylphenols. The difference among the foregoing three Igepal surfactants is the length of the "—$CH_2CH_2O$—" chain between the phenolic oxygen atom and the terminal —$CH_2CH_2OH$ moiety. The suspensions were formed using 5 wt % CDD/surfactant and 95 wt % water. When the CA 520 and CA 720 surfactants are co-prilled with CDD, the resulting prilled materials is hydrophilic and can be suspended in the water. When CDD is co-prilled CA 210, the resulting material is hydrophobic and does not suspend in water. The difference is believed due to the longer length of the "—$CH_2CH_2O$—" chain in the CA 520 and CA 720 surfactants (4 and 11 "—$CH_2CH_2O$—" units, respectively) versus that in CA 210 (1 "—$CH_2CH_2O$—" unit). The chain must be of sufficient length to insure that there is a sufficient hydration sphere about the prilled material to keep it in suspension. A short chain results in a small hydration sphere that is insufficient for suspension of the prilled material, whereas a long chain of 4 or more "—$CH_2CH_2O$—" units, with its resulting much larger hydration sphere, results in a suspended prilled material.

The co-prilled pore forming materials described herein can be used to replace part or all of the traditional pore forming materials used in making ceramic honeycomb bodies; for example those made of cordierite, aluminum titanate (AT), SiC (silicon carbide), mullite and other ceramic materials known in the art that require the use of pore forming materials that are burned away during the firing process. Traditional pore forming materials include graphite, activated carbon, starch, flour, foamed resin, polymer beads such as acrylic beads and methacrylate beads, a flour, and a phenolic resin.

Examples of ceramic batch material compositions for forming cordierite that can be used in practicing the present disclosure are disclosed in U.S. Pat. Nos. 3,885,977; 4,950,628, RE 38,888; 6,368,992; 6,319,870; 6,210,626; 5,183,608; 5,258,150; 6,432,856; 6,773,657; 6,864,198; and U.S. Patent Application Publication Nos. 2004/0029707, 2004/0261384, and 2005/0046063. Cordierite bodies are formed from inorganic ceramic-forming materials including silica, alumina and magnesia that can be supplied in the form of talc, kaolin, aluminum oxide and amorphous silica powders, and may contain other materials as indicated in the cited art. The powders are combined in proportions such as recited in the art as being suitable for forming cordierite bodies. The inorganic cordierite ceramic-forming ingredients (such as, the silica, talc, clay and alumina supplied as an inorganic powder), an organic binder and a pore forming agent are mixed together with a liquid to form the ceramic precursor batch. The liquid may provide a medium for the binder to dissolve in, thus providing plasticity to the batch and wetting of the powders. The liquid may be aqueous based, which may normally be water or water-miscible solvents, or organically based. Aqueous based liquids can provide hydration of the binder and powder particles. In some embodiments the amount of liquid is added as a super-addition and is from about 20% by weight to about 50% by weight of the inorganic ceramic-forming powder. Batch materials include the ceramic-forming inorganic materials, organic binder(s) and a pore forming agent; and may additionally include lubricants and selected liquids as known and described in the art.

Examples of ceramic batch material compositions for forming aluminum titanate and derivatives (for example without limitation, mullite aluminum titanate and strontium feldspar aluminum titanate) that can be used in practicing the present disclosure are those disclosed in U.S. Pat. Nos. 4,483,944, 4,855,265, 5,290,739, 6,620,751, 6,942,713, 6,849,181, 7,001,861, 7,259,120, 7,294,164; U.S. Patent Application Publication Nos.: 2004/0020846 and 2004/0092381; and in PCT Application Publication Nos. WO 2006/015240, WO 2005/046840 and WO 2004/011386. The foregoing patents and patent publications disclose aluminum titanate bodies of varying composition, all of which can be used in practicing the present disclosure. Herein, the inorganic materials used for making an alumina titanate body are referred to as an "inorganic ceramic forming powder. Batch materials include the ceramic-forming inorganic materials, organic binder(s) and a pore forming agent; and may additionally include lubricants and selected liquids as described herein and as known in the art. The inorganic aluminum titanate ceramic-forming ingredients (for example without limitation, alumina, titania and other materials as indicated herein and in the cited art), the organic binder and the pore forming agent may be mixed together with a liquid to form the ceramic-forming precursor batch. The liquid may provide a medium for the binder to dissolve in, thus providing plasticity to the batch and wetting of the powders. The liquid may be aqueous based, which may normally be water or water-miscible solvents, or organically based. Aqueous based liquids can provide hydration of the binder and powder particles. In some embodiments the amount of liquid is from about 20% by weight to about 50% by weight of the inorganic ceramic-forming materials.

Examples of ceramic batch material compositions and processes for forming mullite honeycombs that can be used in practicing the present disclosure are those disclosed in U.S. Pat. Nos. 4,601,997, 6,238,619, and 6,254,822; U.S. Patent Application Publication Nos.: 2004/0020846 and 2004/0092381; and in U.S. Application Publication No. WO US 2008/0293564. Examples of ceramic batch material compositions and processes for forming SiC (silicon carbide) honeycombs that can be used in practicing the present disclosure are those disclosed in U.S. Pat. Nos. 4,299,631, 6,555,031, 6,555,031 and 6,699,429; and U.S. Patent Application Publication No.: 22009/0011179 PCT Application Publication Nos. WO 2006/015240, WO 2005/046840 and WO 2004/011386.

Figure 8:
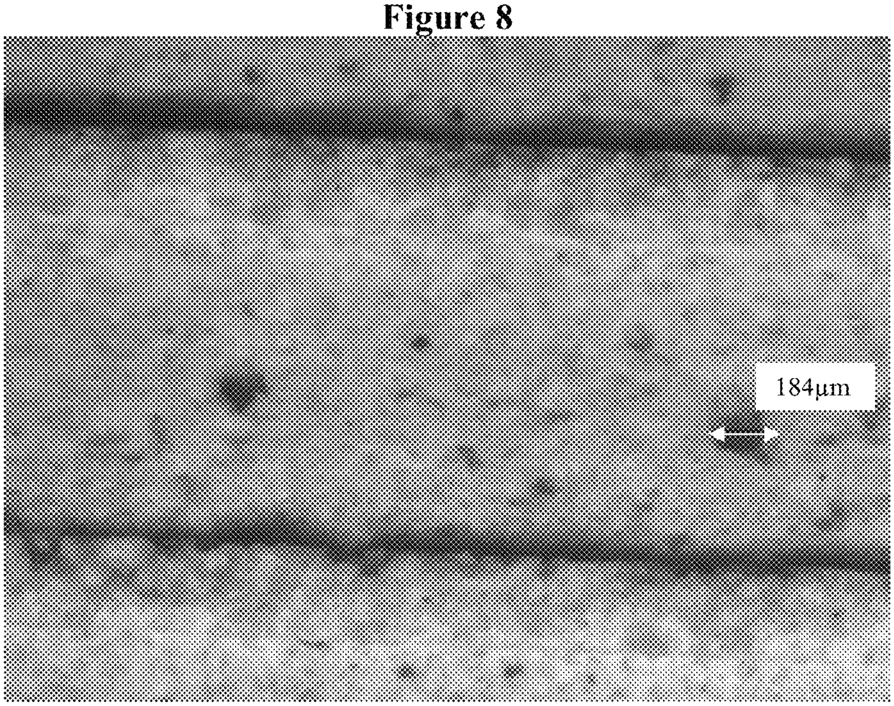
FIG. 8 is a photograph illustrating a fired ceramic having holes through the ceramic's walls due to wax bead agglomerates in the batched.
Figure 9:
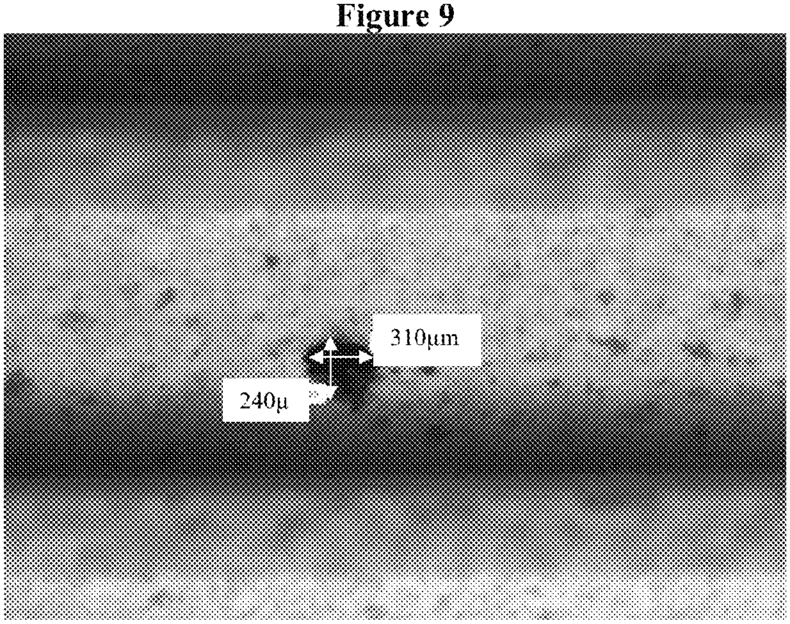
FIG. 9 is a photograph illustrating a fired ceramic having holes through the ceramic's walls due to wax bead agglomerates in the batched.

The method of making a honeycomb body includes batching selected ingredients to form a material batch suitable for forming a selected honeycomb body (see the above paragraphs and references); forming a green body from said batch materials; and firing said green body to form a ceramic honeycomb body. The honeycomb body can be either a flow-through substrate or a plugged honeycomb body such as a particulate filter or trap. The bodies of FIGS. 8 and 9 were made using prilled CDD only—no non-ionic surfactant was added to the CDD wax. The Figures show the holes, and the size of a representative hole in each figure, that are formed in the ceramic body walls due to poor pore former distribution. Bodies made using CDD co-prilled with a non-ionic surfactant did not exhibit such holes.

Figure 10:
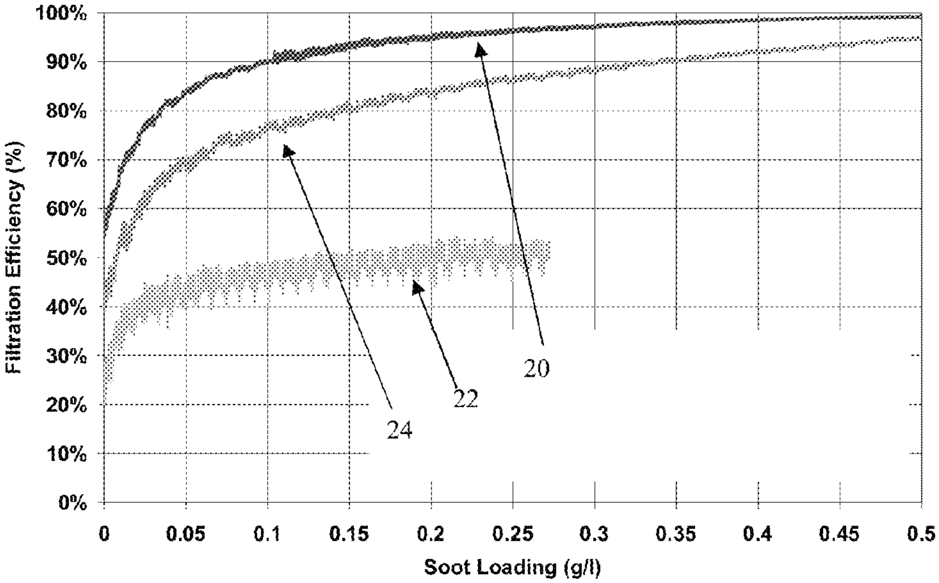
FIG. 10 is a graph illustrating filtration efficiency versus soot loading of a cordierite ceramic filter trap prepared using CDD alone (no surfactant) as a pore former versus a filter trap prepared using a combination of graphite and potato starch as pore former.

FIG. 10 is a graph showing filtration efficiency versus soot loading for a high porosity honeycomb body prepared using graphite/potato starch as a pore former (curve 20), and the best (curve 24) and worst (curve 22) case examples for honeycomb bodies prepared using CDD pore former without added non-ionic surfactant. As FIG. 10 illustrates, when CDD without surfactant is used as a pore former the resulting bodies have a lower filtration efficiency due to hole formation as a result of CDD agglomeration.

Figure 11:
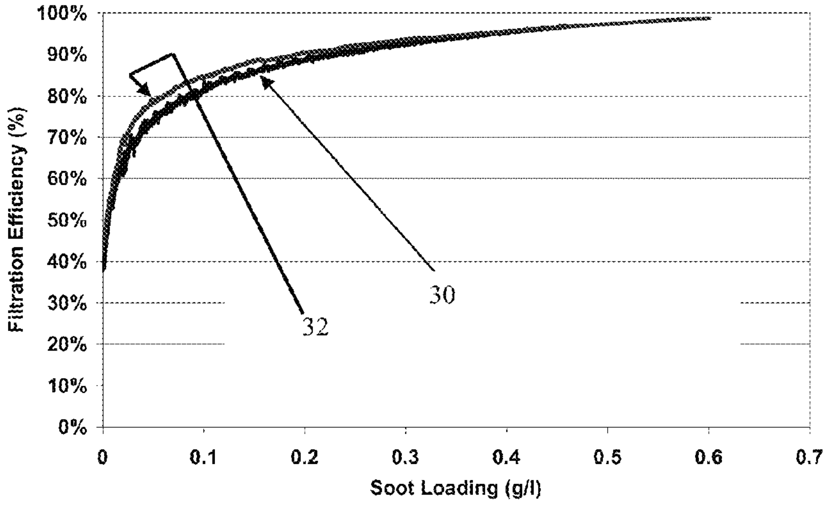
FIG. 11 is a graph illustrating filtration efficiency versus soot loading of a cordierite ceramic filter trap prepared using CDD+5 wt % Tergitol NP-10 non-ionic surfactant as a pore former versus a filter trap prepared using a combination of graphite and potato starch as pore former.

FIG. 11 illustrates that honeycomb bodies made using CDD with surfactant as pore former (curve 30) matched the filtration efficiency of the honeycomb bodies formed using graphite/potato starch pore former (curve 32). FIG. 11, which compares a high porosity honeycomb body made with graphite/potato starch pore former to a honeycomb body made using a CDD/NP-10 co-prilled pore former (curve 30), shows that full filtration is reached when CDD is co-prilled with the NP-10 surfactant. Use of the surfactant prevents the co-prilled CDD/NP-10 from agglomerating during preparation of batch materials. As a result, when the batch materials are extruded and fired defects such as holes and cracks do not appear and full filtration efficiency is reached. In addition, the CDD/surfactant containing green bodies did not exhibit the high exotherm seen when graphite/potato starch containing green bodies are fired.

Thus, in one aspect the disclosure is directed to a free-flowing, water dispersible solid wax material consisting essentially of a co-prilled wax having a melting point less than or equal to 170° C. and a non-ionic surfactant having an HLB>6. In an embodiment said non-ionic surfactant has an HLB>10. In a further embodiment the wax has a melting point in the range of 45-170° C. In an additional embodiment the wax has a melting point in the range of 80-130° C. In an additional embodiment, the wax used in making the water dispersible wax/non-ionic surfactant material is selected from the group consisting natural paraffin waxes, beeswax, polyethylene glycol waxes, polypropylene glycol waxes and waxes made from a combination polyethylene glycol and polypropylene glycol, chemically modified waxes, substituted amide waxes, polymerized α-olefin waxes including combinations of α-olefins, and combinations thereof. In an other additional embodiment, the non-ionic surfactant used in making wax/non-ionic surfactant material is selected from the group consisting of ethoxylated nonylphenols, ethoxylated octylphenols, PEO-PPO-copolymers, Tween 80 (polyoxyethylene sorbitan monooleate), dodecylphenol ethoxylate, dinonylphenol ethoxylate, linear and branched alcohol ethoxylates, tallow amine ethoxylate and combinations thereof.

In another aspect the disclosure is directed to a method of making a free-flowing water dispersible solid wax material by melting a wax having a melting point less than or equal to 170° C. in a heated vessel; mixing a non-ionic surfactant having an HLB>6 into the molten wax to form a molten wax/surfactant mixture, and prilling the molten wax/surfactant mixture to form a free-flowing, water dispersible solid wax/surfactant material.

In a further aspect the disclosure is a method for preparing a ceramic body, comprising the steps of providing a ceramic forming batch composition; providing a binder material, a liquid and a solid particulate pore former comprising a wax/surfactant material as described herein; mixing the batch composition with the binder material, the liquid and the pore former to form a plasticized extrudable paste; extruding the paste to form an extruded pre-ceramic green body; drying the green body to form a dried pre-ceramic green body; and firing the dried pre-ceramic body at firing conditions to form a ceramic body, advantageously a cordierite, mullite, SiC or aluminum titanate ceramic body. The ceramic forming batch composition can be selected from the group consisting of a cordierite batch composition, a mullite batch composition, a SiC batch composition and an aluminum titanate batch composition. In one embodiment the fired ceramic body is a honeycomb ceramic body. The fired honeycomb body can be made into a ceramic filter trap by alternate plugging of channels on each face of the honeycomb so that the flow of particulate containing gases, which enters unplugged channels, is forced through the walls of the honeycomb and exits different unplugged channels.

Additionally, the disclosure is directed to an extruded pre-ceramic green body, advantageously an extruded honeycomb pre-ceramic green body, said green body comprising ceramic-forming inorganic materials, an organic binder(s), a pore forming agent comprising a wax/surfactant material as described herein and water, and, optionally, lubricants. The extruded pre-ceramic honeycomb green body can be made of ceramic-forming inorganic materials selected from the group consisting of cordierite ceramic-forming materials, aluminum titanate ceramic-forming materials, SiC and mullite ceramic-forming materials.

While the invention has been described with respect to a limited number of embodiments, those skilled in the art, having benefit of this disclosure, will appreciate that other embodiments can be devised which do not depart from the scope of the invention as disclosed herein.

The invention claimed is:

1. A method for preparing a ceramic body, comprising the steps of:

providing a ceramic forming batch composition;

providing a binder material, a liquid and a solid particulate pore former comprising a selected water dispersible wax/non-ionic surfactant material;

mixing the batch composition with the binder material, the liquid and the pore former to form a plasticized extrudable paste;

extruding the paste to form an extruded pre-ceramic green body; and drying the green body to form a dried pre-ceramic green body; and firing the dried pre-ceramic body to form a ceramic body:

wherein the water dispersible wax/non-ionic surfactant material is a co-prilled material formed from:

a wax is selected from the group consisting of natural paraffin waxes, beeswax, polyethylene glycol waxes, polypropylene glycol waxes and waxes made from a combination polyethylene glycol and polypropylene glycol, chemically modified waxes, substituted amide waxes, polymerized α-olefin waxes including combinations of α-olefins, and combinations thereof, and a non-ionic surfactant is selected from the group consisting of ethoxylated nonylphenols, ethoxylated octylphenols, PEO-PPO-copolymers, polyoxyethylene sorbitan monooleate, dodecylphenol ethoxylate, dinonylphenol ethoxylate, linear and branched alcohol ethoxylates, tallow amine ethoxylate and combinations thereof.

2. The method according to claim 1, wherein the ceramic forming batch composition is selected from the group consisting of a cordierite batch composition, a mullite batch composition, a SiC batch composition and an aluminum titanate batch composition.

3. The method according to claim 1, wherein the dried pre-ceramic body is fired at firing conditions to form a cordierite, mullite, SiC or aluminum titanate ceramic body.

4. The method according to claim 1, wherein the fired ceramic body is a honeycomb ceramic body.

5. The method according to claim 4, wherein the fired ceramic honeycomb body is made from ceramic-forming inorganic materials selected from the group consisting of cordierite ceramic-forming materials, aluminum titanate ceramic-forming materials, SiC and mullite ceramic-forming materials.

* * * * *